United States Patent [19]

Van Capelleveen

[11] 4,392,768
[45] Jul. 12, 1983

[54] INTERMEDIATE STORAGE BAKING TINS

[75] Inventor: Pieter Van Capelleveen, Zeist, Netherlands

[73] Assignee: Gebr. van Capelleveen B.V., Utrecht, Netherlands

[21] Appl. No.: 192,040

[22] Filed: Sep. 29, 1980

[30] Foreign Application Priority Data

Sep. 28, 1979 [NL] Netherlands .......................... 7907258

[51] Int. Cl.³ .............................................. B65G 1/06
[52] U.S. Cl. .................................. 414/278; 198/801; 414/358
[58] Field of Search .................. 414/278, 285, 331; 198/801, 653, 484, 358

[56] References Cited

U.S. PATENT DOCUMENTS

| 2,718,972 | 9/1955 | Temple | 414/278 |
| 2,941,655 | 6/1960 | Wells | 198/801 |
| 3,664,534 | 5/1972 | Hunter | 414/278 |
| 3,700,121 | 10/1972 | McManus | 414/331 |
| 3,782,563 | 1/1974 | Brockmeyer | 414/278 |
| 3,850,316 | 11/1974 | Schmitt | 414/278 |
| 3,937,335 | 2/1976 | Lanham | 198/358 |
| 3,986,446 | 10/1976 | Thompson | 198/801 |

FOREIGN PATENT DOCUMENTS 7530336  7/1962  France.
 872479  7/1961  United Kingdom ................ 414/278

Primary Examiner—Sherman D. Basinger
Assistant Examiner—D. W. Keen
Attorney, Agent, or Firm—Cushman, Darby & Cushman

[57] ABSTRACT

Storage method, in particular intermediate storage method for baking tins, whereby the baking tins are disposed in racks wherein the baking tins are positioned story-wise in rows behind each other and always one type of baking tin per each rack.

4 Claims, 5 Drawing Figures

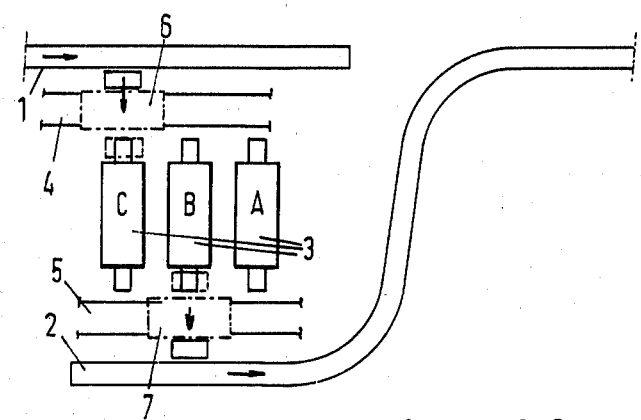
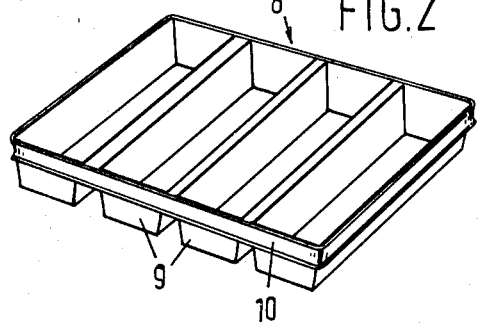
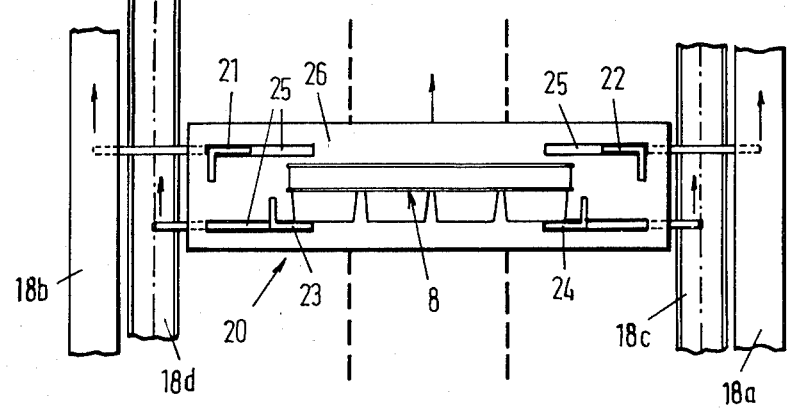

INTERMEDIATE STORAGE BAKING TINS

In the bakery baking tins in various types and dimensions are used for different types of bread, cake and the like. Depending on the size of the bakery, there are available numbers of 1000 to 6000 pieces/type which, when not in use, have to be stored temporarily.

For said intermediate storage of said baking tins which mostly slightly taper in connection with the unloading of the batch and sometimes are coupled groupwise, various methods are known which in most cases imply that the baking tins or "couples" are nested, i.e. are stacked in partly telescoped condition. Apparatus used for this purpose are so-called stackers and unstackers.

Drawbacks going with this prior art technique are:

The baking tins should be adapted to the specific stacking method and also for unstacking of telescoped baking tins, additional engagement ridges and the like are to be provided with the tins.

To enable in this manner stacking and unstacking, an accurate dimensioning is necessary. Damaged, deformed baking tins will jam.

Stacking with telescoping has the drawback that no plastics lining can be utilized.

It is the object of the invention to avoid the above drawbacks, to which effect the invention provides an (intermediate) storage method according to which the baking tins are disposed in racks wherein the tins are positioned storey-wise in rows behind each other and always one type of baking tin per each rack.

In a further embodiment of the invention more racks can be adjacently arranged and be accessible on either side so that the racks may be loaded at a leading end and the baking tins may be taken from the other end, which has the advantage that, while one type of baking tin is positioned in a rack, simultaneously another type of baking tin may be taken from a different rack and be brought in the baking circuit so that switching from the one type to the other can take place substantially without loss of time. Furthermore it is also possible to always work from one leading end.

For performing the method, the invention provides a storage apparatus with a rack construction, provided with carriers vertically spaced in a frame, each for one row of baking tins, means being provided for positioning the baking tins vertically and horizontally.

Thereby according to the invention the carriers at each level in a rack may be provided with two laterally spaced support faces and there being accommodated in the rack a horizontal conveying means adjustable in height and by means of which a substantially united row of baking tins can be formed on each carrier, starting with a leading end of the carrier, respectively the baking tins can be discharged from a row via the same or via the other leading end of the carrier.

The vertical conveying means may comprise a lifting device at one or each of the leading ends of the rack, for bridging differences in height between each carrier in the rack and conveyors, by means of which baking tins are supplied, respectively discharged.

In order to store the baking tins simultaneously and to bring other tins from the store into the baking circuit, according to the invention a plurality of racks may be arranged in adjacent relationship with a leading end adjacent a baking tin supply conveyor and adjacent a baking tin discharge conveyor, whereby between the racks on the one end and the respective conveyors on the other end lifting devices are disposed that are movable parallel to the respective conveyor and which can be positioned before any required rack.

In a preferred embodiment of the invention each lifting device is provided with an endless conveyor circulating along an upper curve and a lower curve, said conveyor having projecting baking tin engaging means, whereby the rising part of a lifting device coacting with the baking tin supply conveyor is facing towards the conveyor and the descending part of a lifting device coacting with the discharge conveyor is facing towards the conveyor.

By means of such a device baking tins lying with the open side upwards on the supply conveyor are engaged, pivoted upwards over the upper curve of the lifting device and positioned on a rack in inversed position. The advantage thereof is that bread remainders and similar contaminations remaining in the baking tins may fall out of the tins during the reversal, while likewise it is prevented that during the storage of the tins pollution occurs by vermin and the like.

It will be clear that the reliability of operation of such a device is larger than of devices through which baking tins are stacked nestingly. The timed drive and control of the various conveying means may be performed through application of known per se sensors and signal transmitters. Translation means are applied between the various conveyors, lifting means and conveying means within the racks.

For the purpose of receiving the baking tins from the supply conveyor, the lifting with the rising part of the conveyors of the lifting device, conducting along the upper curve and likewise reversing the baking tin and the lowering thereof in the descending part of the conveyor to the level of the storey of a rack to be filled, according to the invention the engaging means of the lifting device may each be fitted with two baking tin support means, one of which being operated in the rising path and the other in the descending path.

Preferably each baking tin support means is provided with two support fingers which are adapted for lateral movement towards and away from each other, in such a way that both in the rising path and in the descending path each time the lower fingers are moved towards each other for engaging a baking tin underneath the lateral portions thereof, while each time the upper fingers are moved away from each other at least in the entire descending path.

A simple and reliable control of the fingers is achieved by designing each finger slidably in a longitudinal slot in a common guide plate while controlling each finger by means of a driven chain enclosed in a suitable C-profile, whereby the profiles associated with the fingers of one pair in the rising path and the descending path have a different interspace at least locally, depending on the function of the respective finger pair.

It is observed that the storage method according to the invention wherein use is made of racks, wherein baking tins are positioned storey-wise in rows behind each other through means for vertically and horizontally positioning the baking tins, may also be employed for loading so-called dough inhibiting proofers, wherein by cooling the proofing process is temporarily discontinued. It will be clear that in this case the lifting device may not reverse the dough-filled baking tins and consequently it is possible to apply as lifting device, in general as vertical positioning means a lifting platform having transfer means as pusher members.

One embodiment of the (intermediate) storage apparatus for baking tins will now be described, by way of example, with reference to the accompanying drawings, wherein FIG. 1 diagrammatically shows a top view of the arrangement of the major elements of the apparatus;

FIG. 2 is a perspective view of a baking tin composed of four interconnected baking tins;

FIG. 5 is a view on the line V—V in FIG. 3.

Figure 3:
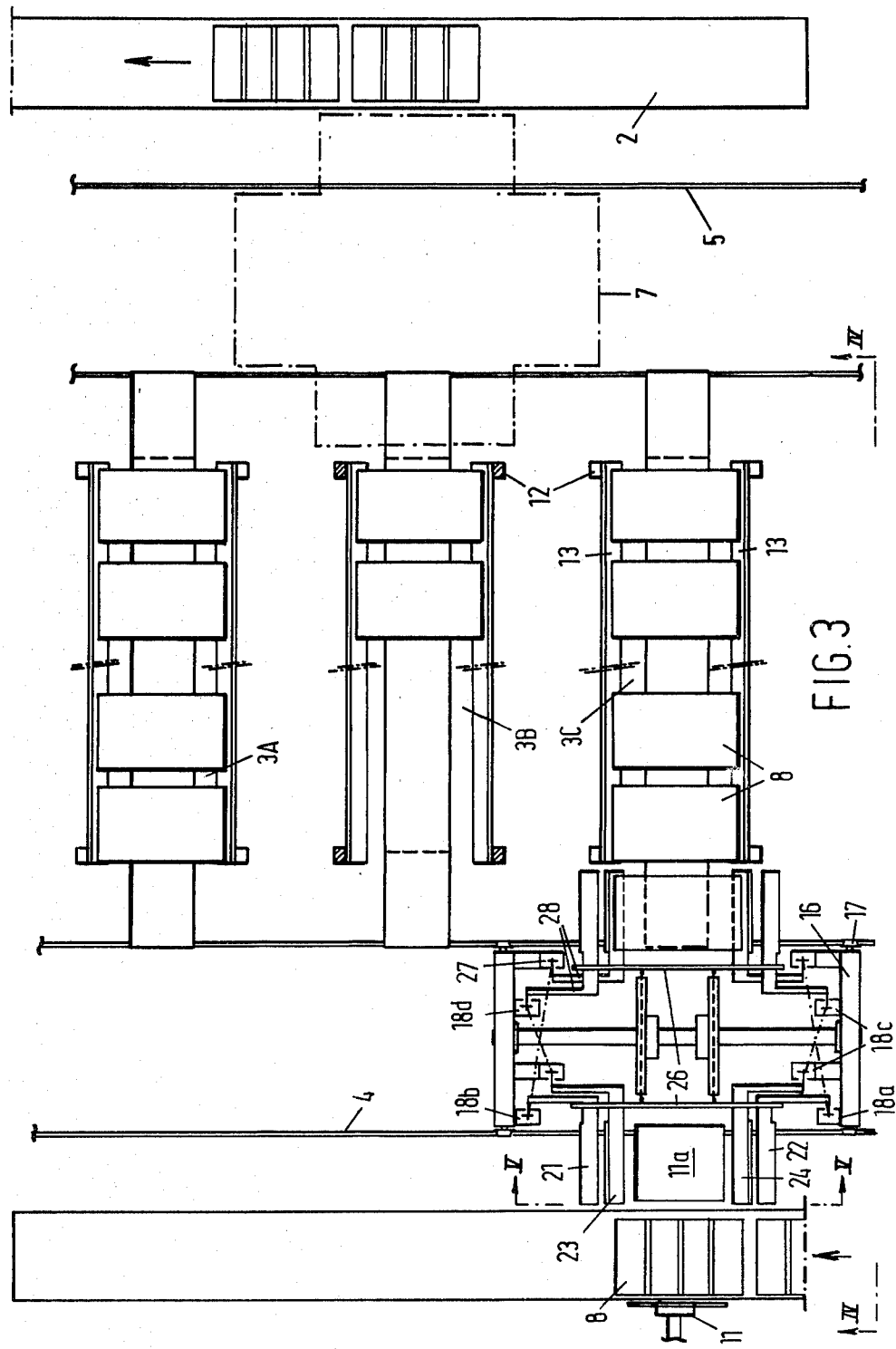
FIG. 3 is an enlarged detail of FIG. 1.

According to the drawings, in particular FIG. 1, the intermediate storage apparatus for baking tins of the type shown in FIG. 2 however is naturally also suitable for other articles for storage and/or intermediate storage to be eligible, provided with a supply conveyor 1, a discharge conveyor 2, a plurality of storage racks 3A, B, C, . . . arranged transversely between the parallelly extending conveyors 1 and 2, e.g. lifting devices 6 and 7 movable for instance along rails 4 and 5. The racks 3 are distinguished in FIG. 1 by letters A, B and C to indicate that in principle in each rack a different type of article, e.g. baking tins can be stored for different baking products.

It appears from the general arrangement of FIG. 1 that the storage principle is based on the supply of baking tins, e.g. of the type C over the supply conveyor 1, the filling, by means of the lifting device 6, which is arranged for this purpose between the supply conveyor 1 and the rack 3C, of said rack with articles of type C, while it is simultaneously possible to transfer another type of articles, e.g. type B, via the lifting device 7 onto the discharge conveyor 2, which conducts these articles, e.g. baking tins B, into the baking circuit.

Figure 4:
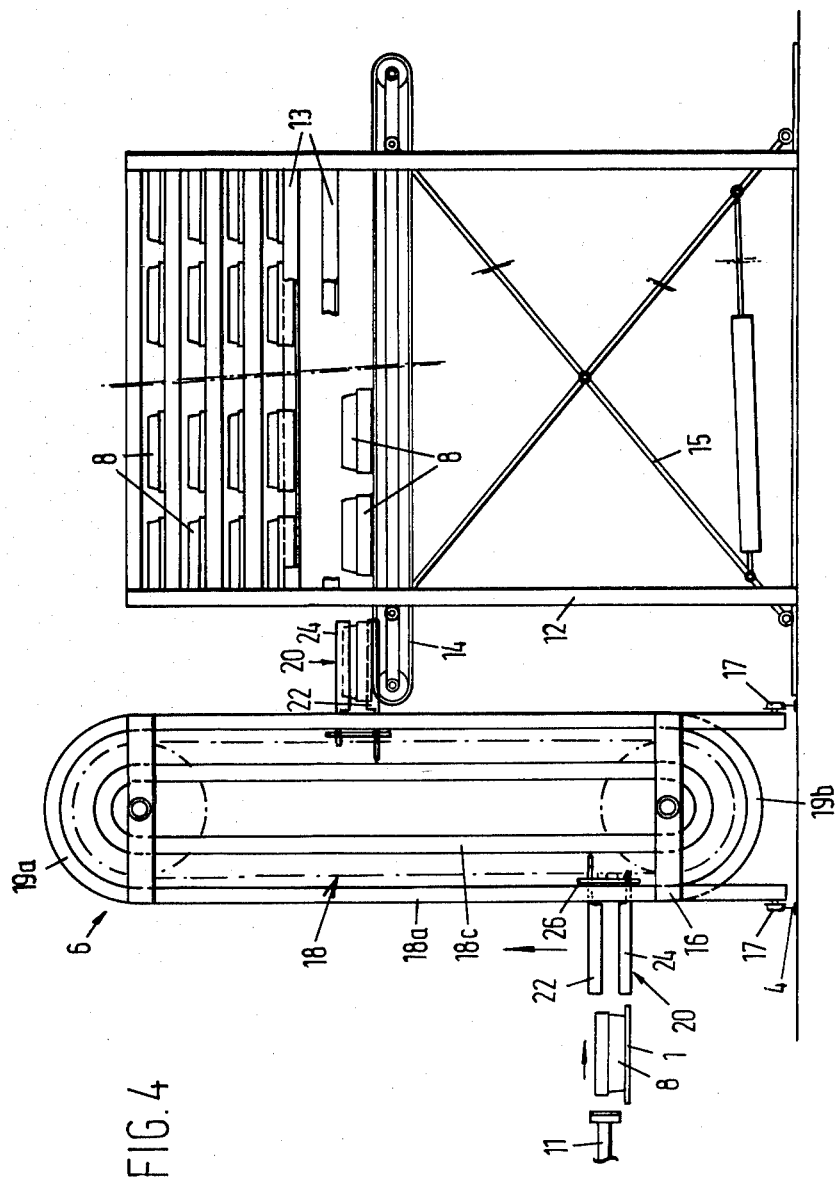
FIG. 4 is a view on the line IV—IV in FIG. 3.

Referring to FIGS. 3 and 4, the loading of a rack 3 will now be further discussed, the starting point being that the articles to be handled are baking tins 8 of the type shown in FIG. 2, viz. each composed of a plurality of downwardly tapering baking tins 9, which are united to one unit 8 by a circular belt 10.

A rack 3 comprises a frame 12 with sets of guide members 13 extending longitudinally therein in subjacent relationship, and constituting bearing surfaces for rows of baking tins 8.

The filling of a rack is effected from the top downwards by means of the lifting device 6 and a horizontal conveying means, such as a conveyor belt 14 which is vertically adjustable for instance by means of a linkage mechanism 15 diagrammatically shown in FIG. 4. The vertical adjustment is effected preferably in such a way that the upper parts of the conveyor belt 14 can each time be positioned at a slightly higher level than the effective bearing surface of the bearing guide members 13, so that a series of baking tins 8 positioned on a bearing guide set is movable along the bearing guides from the entry side (FIG. 4 at the left) towards the discharge side.

The lifting device 6 comprises a frame 16 which is movable on wheels 17 along rails 4 between the supply conveyor 1 and the series of racks 3.

In the frame 16 a conveyor means 18 according to the arrows drawn in FIG. 4 is movable along an upper curve 19a and a lower curve 19b.

The conveying means 18, distributed over its length, carries a plurality of pick-up means 20 for the baking tins 8. FIG. 4 only shows two of the pick-up means and one embodiment thereof will be further discussed.

With the apparatus shown in FIGS. 3 and 4 baking tins 8 are transferred from the supply conveyor 1 and by means of a pusher member 11 to a ready pick-up means 20 which together with the baking tin is conducted upwards by the conveying means 18, conducted along the upper curve 19a and subsequently is again lowered to the level of the horizontal conveying means 14 which is disposed between a set of bearing guides 13 whereon the respective baking tin has to be positioned. It is assumed that the superposed bearing guide sets are already entirely filled with rows of baking tins 8. The thus (see FIG. 4) entrained baking tin is positioned in reversed position on the horizontal conveying means, in particular the conveyor belt 14, which ensures the moving up of the baking tin and the preceding baking tins 8 along the bearing guides 13. Thus the rack 3 (FIG. 4) is filled from the top downwards and from the left to the right.

Similarly baking tins of a different rack, e.g. the rack 3B, may be unloaded from the bottom to the top and be positioned through the lifting device 7 on the discharge conveyor 2.

Provisions have to be made for the baking tin pick-up means 20 for receiving the baking tins from the supply conveyor 1, for moving same vertically upwards, reversing same along the upper curve 19a and subsequently for moving same again downwards and translating same onto the conveyor belt 14.

It is conceivable that the paths of the pick-up means 20 and of the conveyor belt 14 do not contact each other and that use is made of separate transfer means for transferring a baking tin onto the conveyor belt 14.

Simpler from a mechanical viewpoint however is to have the paths of the pick-up means 20 and of the conveyor belt 14 overlap each other, so that the pick-up means 20 can position baking tins directly onto the conveyor belt 14. In this case however measures have to be taken to remove the grip of the pick-up means on baking tins which are deposited on the conveyor belt 14.

One embodiment of the pick-up means enabling the above arrangement is depicted in FIGS. 3 and 5.

In these each pick-up means 20 is fitted with four support fingers 21, 22, 23, 24 each having the shape of an angle section and projecting through a longitudinal slot 25 in a guide plate 26. As appears from FIGS. 3 and 5 the fingers 23 and 24 have moved towards each other and are adapted to pick-up a baking tin 8 which is positioned by pusher member 11 on a table 11a by engaging same sideways underneath the belt 10 or underneath the bottom of the tins 9. The fingers 21 and 22 have moved away from each other and remain in this position in the entire rising part of the conveyor means 18 (see FIG. 4). However it is possible to move the fingers 21 and 22 away from each other only in the zone where baking tins 8 are engaged. In the upper curve 19a, in so far this has not been effected earlier, also the fingers 21 and 22 move towards each other and take the baking tin 8 over from the finger 23 and 24 which then move away from each other and in the entire descending path of the conveying means 18. The control of the fingers 21, 22, 23, 24 is effected by means of driven chains 27 confined in guide sections 18a–18d. Each of the fingers 21–24 is connected through a carrier 28 to the chain 27 of the associated guide sections 18a–18d. As indicated by dotted lines in FIG. 3, the various guide sections 18a–18d have been shifted in the upper and in the lower curve, so that in the rising path of the lifting device 6 the guide sections 18c and 18d are relatively close to each other and in the descending path selectively remote from each other, while in the guide section 18a–18b this is precisely the opposite. In principle, it is thus possible to apply per each baking tin pick-up means 20, a number of which is present in spaced relationship on the conveyor means of the lifting device 6, four fingers 21–24 each controlled separately and carried by the associated chains 27, which fingers in each pick-up means are kept together and are centered by a guide plate 27.

This embodiment has the advantage that separate transfer means for transferring baking tins onto the conveyor belt 14 of a rack can be omitted.

In order to enable a rapid displacement of a lifting device 6 or 7 along the rails 4, respectively 5 along the racks 3A, 3B . . . etc., the portions of the conveyor belt 14 projecting from the rack 12, dotted in FIG. 3, may be designed retractable, which can be effected in various known per se manners.

Although one embodiment has been described, wherein the racks 3 are arranged between the supply conveyor 1 and the discharge conveyor 2, it is possible that the racks are loaded and unloaded from the same leading end. Preferably in this case, in situ of the racks, the conveyors 1 and 2 are superimposed.

I claim:

1. Apparatus for storing a plurality of different types of baking tins comprising: a baking tin supply conveyor; a baking tin discharge conveyor spaced from and having a portion generally parallel to a portion of said supply conveyor; a plurality of storage racks arranged side-by-side between said portions of said conveyors, each storage rack having a supply end facing said supply conveyor and a discharge end facing said discharge conveyor and each storage rack including a plurality of horizontal carriers extending from the supply end to the discharge end of the respective rack, the carriers of each rack having a length sufficient to receive a horizontal row of baking tins and being arranged one above another in vertically spaced-apart relationship; and transfer means for removing baking tins from said supply conveyor, delivering the removed baking tins to the supply ends of said carriers in a manner to form horizontal rows of baking tins on said carriers, removing baking tins from the discharge ends of said carriers and delivering the so-removed baking tins to said discharge conveyor, said transfer means including a first endless conveyor located between said supply conveyor and the supply ends of said racks, said first conveyor having an upwardly movable run and a downwardly movable run, said runs having baking tin pickup and releasing means projecting therefrom and said upwardly movable run facing said supply conveyor, said transfer means further including a second endless conveyor located between said discharge conveyor and the discharge ends of said racks, said second conveyor having an upwardly movable run and a downwardly movable run, said runs having baking tin pickup and releasing means projecting therefrom and said downwardly movable run facing said discharge conveyor, said first and second conveyors being movable parallel to their respective racks so as to be positionable adjacent an end of any desired rack.

2. Apparatus as in claim 1 wherein the baking tin pickup and releasing means are each fitted with two baking tin support members, one of which is operative in the rising path and the other in the descending path.

3. Apparatus as in claim 2 wherein each baking tin support member is provided with two support fingers which are adapted for lateral movement towards each other and away from each other, in such a way that both in the rising path and in the descending path each time the lower fingers move towards each other for engaging a baking tin underneath the lateral parts thereof, the upper fingers move away from each other at least in the entire descending path.

4. Apparatus as in claim 3 wherein each finger of a pickup means is slidable in a longitudinal slot in a common guide plate and each finger is controlled by means of a driven chain confined in a fitting C-section, whereby the sections associated with the fingers of one pair in the rising path and in the descending path, at least locally have a different interspace, depending on the function of the respective finger pair.

* * * * *